US011290745B2

(12) United States Patent
Toma et al.

(10) Patent No.: US 11,290,745 B2
(45) Date of Patent: Mar. 29, 2022

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Tadamasa Toma, Osaka (JP); Takahiro Nishi, Nara (JP); Kengo Terada, Osaka (JP); Yui Koashi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 22 days.

(21) Appl. No.: 15/996,710

(22) Filed: Jun. 4, 2018

(65) Prior Publication Data
US 2018/0278956 A1    Sep. 27, 2018

Related U.S. Application Data

(63) Continuation of application No. PCT/JP2016/005041, filed on Dec. 1, 2016.
(Continued)

(30) Foreign Application Priority Data

Nov. 18, 2016   (JP) ............................. JP2016-225504

(51) Int. Cl.
*H04N 19/597*    (2014.01)
*G06T 9/00*       (2006.01)
(Continued)

(52) U.S. Cl.
CPC .......... *H04N 19/597* (2014.11); *G06T 9/001* (2013.01); *G06T 9/004* (2013.01); *H04N 19/436* (2014.11); *H04N 19/503* (2014.11); *H04N 19/593* (2014.11)

(58) Field of Classification Search
CPC .... G06T 19/00; H04N 19/436; H04N 19/503; H04N 19/593; H04N 19/597
See application file for complete search history.

(56) References Cited

U.S. PATENT DOCUMENTS 4,999,705 A * 3/1991 Puri ....................... H04N 19/00
                                                             348/412.1
5,559,931 A * 9/1996 Shindou ............... H04N 19/503
                                                               358/1.15
(Continued)

FOREIGN PATENT DOCUMENTS

JP      11-265460       9/1999
JP      2000-338900    12/2000

OTHER PUBLICATIONS

Extended European Search Report dated Jan. 9, 2019 in corresponding European Patent Application No. 16875104.8.
(Continued)

*Primary Examiner* — Peter D Le
(74) *Attorney, Agent, or Firm* — Wenderoth, Lind & Ponack, L.L.P.

(57) ABSTRACT

Provided is a three-dimensional data encoding method capable of providing random access functionality for encoded three-dimensional data. The three-dimensional data encoding method is a three-dimensional data encoding method for encoding three-dimensional data, the method including: dividing the three-dimensional data into first processing units, each being a random access unit and being associated with three-dimensional coordinates; and encod-
(Continued)

| OBJECT | GOS NUMBER |
|---|---|
| object(1) | 1, 2 |
| object(2) | 5 |
| object(3) | 8, 9, 10 |
| ... | ... |
| object(N) | 101, 113, 125 |

OBJECT-GOS TABLE

| COORDINATES | GOS NUMBER |
|---|---|
| (x1, y1, z1) | 1 |
| (x2, y2, z2) | 2 |
| (x3, y3, z3) | 3 |
| ... | ... |
| (xN, yN, zN) | N |

COORDINATES-GOS TABLE

| TIME | GOS NUMBER |
|---|---|
| pts(1) | 1 |
| pts(2) | 30 |
| pts(3) | 50 |
| ... | ... |
| pts(N) | 200 |

TIME-GOS TABLE

| GOS NUMBER | GOS ADDRESS |
|---|---|
| 1 | addr(1) |
| 2 | addr(2) |
| 3 | addr(3) |
| ... | ... |
| N | addr(N) |

GOS-ADDRESS TABLE ing each of the first processing units to generate encoded three-dimensional data.

21 Claims, 9 Drawing Sheets

Related U.S. Application Data

(60) Provisional application No. 62/266,914, filed on Dec. 14, 2015.

(51) Int. Cl.
*H04N 19/436* (2014.01)
*H04N 19/503* (2014.01)
*H04N 19/593* (2014.01)

(56) References Cited

U.S. PATENT DOCUMENTS

| | | | | |
|---|---|---|---|---|
| 5,675,424 A * | 10/1997 | Park | H04N 19/51 | 358/426.07 |
| 5,684,896 A * | 11/1997 | Stone | H04N 19/176 | 375/E7.049 |
| 6,604,166 B1 * | 8/2003 | Jana | G06F 12/0207 | 711/157 |
| 6,674,911 B1 * | 1/2004 | Pearlman | G06T 9/40 | 375/240.19 |
| 8,615,044 B2 * | 12/2013 | Schoenblum | H04N 19/51 | 375/240.29 |
| 2001/0055063 A1 * | 12/2001 | Nagai | G01S 5/16 | 348/116 |
| 2002/0006164 A1 * | 1/2002 | Felts | H04N 19/647 | 375/240.19 |
| 2002/0009233 A1 * | 1/2002 | Pesquet-Popescu | H04N 19/647 | 382/240 |
| 2002/0015443 A1 * | 2/2002 | Felts | H04N 19/46 | 375/240 |
| 2003/0005140 A1 * | 1/2003 | Dekel | G06Q 50/22 | 709/231 |
| 2003/0038798 A1 * | 2/2003 | Besl | G06T 15/205 | 345/420 |
| 2003/0095177 A1 * | 5/2003 | Yun | H04N 19/597 | 348/42 |
| 2003/0152279 A1 * | 8/2003 | Ohtani | H04N 19/51 | 382/236 |
| 2004/0008779 A1 * | 1/2004 | Lai | H04N 19/433 | 375/240.16 |
| 2004/0081340 A1 * | 4/2004 | Hashimoto | A61B 8/00 | 382/128 |
| 2004/0109679 A1 * | 6/2004 | Watanabe | H04N 5/772 | 386/210 |
| 2004/0114689 A1 * | 6/2004 | Zhang | H04N 19/70 | 375/240.16 |
| 2004/0150639 A1 * | 8/2004 | Park | G06T 9/40 | 345/419 |
| 2006/0114985 A1 * | 6/2006 | Linzer | H04N 19/00 | 375/240 |
| 2006/0193386 A1 * | 8/2006 | Lin | H04N 19/139 | 375/240.16 |
| 2006/0239354 A1 * | 10/2006 | Amano | H04N 19/51 | 375/240.16 |
| 2007/0003122 A1 * | 1/2007 | Sirohey | G06T 7/12 | 382/131 |
| 2007/0036418 A1 * | 2/2007 | Pan | A61B 6/027 | 382/131 |
| 2007/0147686 A1 * | 6/2007 | Joshi | G06T 15/08 | 382/232 |
| 2008/0089428 A1 * | 4/2008 | Nakamura | H04N 19/597 | 375/240.26 |
| 2008/0152215 A1 | 6/2008 | Horie et al. | | |
| 2009/0116558 A1 * | 5/2009 | Chen | H04N 19/597 | 375/240.16 |
| 2009/0213240 A1 * | 8/2009 | Sim | G06T 17/00 | 348/222.1 |
| 2009/0268821 A1 * | 10/2009 | Au | H04N 19/51 | 375/240.16 |
| 2010/0020871 A1 * | 1/2010 | Hannuksela | H04N 21/438 | 375/240.12 |
| 2010/0020877 A1 * | 1/2010 | Au | H04N 19/52 | 375/240.16 |
| 2010/0046613 A1 * | 2/2010 | Jeong | H04N 19/51 | 375/240.2 |
| 2010/0061464 A1 * | 3/2010 | Watanabe | H04N 19/61 | 375/240.24 |
| 2010/0158111 A1 * | 6/2010 | Bordes | G06T 1/005 | 375/240.26 |
| 2011/0103469 A1 * | 5/2011 | Lee | H04N 19/61 | 375/240.03 |
| 2011/0142134 A1 * | 6/2011 | Wahadaniah | H04N 19/176 | 375/240.16 |
| 2011/0142321 A1 * | 6/2011 | Huffman | H04N 21/234327 | 382/131 |
| 2011/0194613 A1 * | 8/2011 | Chen | H04N 19/176 | 375/240.24 |
| 2012/0001778 A1 | 1/2012 | Steiner et al. | | |
| 2012/0051430 A1 * | 3/2012 | Pateux | H04N 19/105 | 375/240.16 |
| 2012/0057777 A1 * | 3/2012 | Uemori | H04N 19/176 | 382/154 |
| 2012/0215788 A1 * | 8/2012 | Ojanpera | G10L 19/008 | 707/741 |
| 2012/0328015 A1 * | 12/2012 | Kim | H04N 19/40 | 375/240.13 |
| 2013/0116561 A1 * | 5/2013 | Rothberg | A61B 8/4254 | 600/438 |
| 2014/0016701 A1 * | 1/2014 | Chen | H04N 19/105 | 375/240.14 |
| 2014/0089962 A1 * | 3/2014 | Ogawa | H04N 21/458 | 725/29 |
| 2014/0139513 A1 * | 5/2014 | Mammou | G06T 1/20 | 345/419 |
| 2014/0139627 A1 * | 5/2014 | Chen | H04N 19/597 | 348/43 |
| 2014/0333619 A1 * | 11/2014 | Morphet | G06T 15/40 | 345/421 |
| 2015/0003512 A1 * | 1/2015 | Deng | H04N 19/187 | 375/240.02 |
| 2016/0119588 A1 * | 4/2016 | Ostby | H04N 19/137 | 348/143 |
| 2016/0127679 A1 * | 5/2016 | Farreguiu | H04L 65/607 | 348/441 |
| 2016/0277739 A1 * | 9/2016 | Puri | H04N 19/61 | |

OTHER PUBLICATIONS

J. Kammerl et al., "Real-time Compression of Point Cloud Streams", 2012 IEEE International Conference On Robotics and Automation (ICRA), pp. 778-785, May 2012.
T. Kim et al., "RACBVHs: Random-Accessible Compressed Bounding Volume Hierarchies", IEEE Transactions on Visualization and Computer Graphics, vol. 16, No. 2, pp. 273-286, Mar. 2010.
F. Rodler, "Wavelet based 3D Compression with Fast Random Access for Very Large Volume Data", Seventh Pacific Conference on Computer Graphics and Applications, 1999, Seoul, South Korea, pp. 108-117, Oct. 1999.
R. Mekuria, "Algorithm for inter-predictive coding of unorganized Point Cloud Data", Iso/Iec JTC1/SC29AVG11, No. m36528, Jun. 2015.
International Search Report (ISR) dated Jan. 17, 2017 in International (PCT) Application No. PCT/JP2016/005041.
Yan Huang, et al., "Octree-Based Progressive Geometry Coding of Point Clouds", Eurographics Symposium on Point-Based Graphics, Jan. 2006.
Office Action dated Feb. 3, 2021 issued for the corresponding European Patent Application No. 16875104.8.

(56) References Cited

OTHER PUBLICATIONS

Sungyul Choe et al., "Random Accessible Mesh Compression Using Mesh Chartification", IEEE Transactions on Visualization and Computer Graphics, IEEE Service Center, Los Alamitos, CA, US, vol. 15, No. 1, Jan. 2009, pp. 160-173, XP011344521.
Office Action dated Jun. 28, 2021 for the corresponding Indian Patent Application No. 201847020805.

* cited by examiner

FIRST SPC

FIG. 10

| OBJECT | GOS NUMBER |
|---|---|
| object(1) | 1, 2 |
| object(2) | 5 |
| object(3) | 8, 9, 10 |
| ... | ... |
| object(N) | 101, 113, 125 |

OBJECT-GOS TABLE

| COORDINATES | GOS NUMBER |
|---|---|
| (x1, y1, z1) | 1 |
| (x2, y2, z2) | 2 |
| (x3, y3, z3) | 3 |
| ... | ... |
| (xN, yN, zN) | N |

COORDINATES-GOS TABLE

| TIME | GOS NUMBER |
|---|---|
| pts(1) | 1 |
| pts(2) | 30 |
| pts(3) | 50 |
| ... | ... |
| pts(N) | 200 |

TIME-GOS TABLE

| GOS NUMBER | GOS ADDRESS |
|---|---|
| 1 | addr(1) |
| 2 | addr(2) |
| 3 | addr(3) |
| ... | ... |
| N | addr(N) |

GOS-ADDRESS TABLE ly described referring to the drawings. Note that the following embodiment shows a specific example of the present disclosure. The numerical values, shapes, materials, structural components, the arrangement and connection of the structural components, steps, the processing order of the steps, etc. shown in the following embodiment are mere examples, and thus are not intended to limit the present disclosure. Of the structural components described in the following embodiment, components not recited in any one of the independent claims that indicate the broadest concepts will be described as optional structural components.

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2016/005041 filed on Dec. 1, 2016, claiming the benefit of priority of Japanese Patent Application Number 2016-225504 filed on Nov. 18, 2016, and U.S. Provisional Application No. 62/266,914 filed on Dec. 14, 2015, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vison that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space (for example, see Octree-Based Progressive Geometry Coding of Point Clouds", Eurographics Symposium on Point-Based Graphics (2006)). In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include MPEG-4 AVC and HEVC standardized by MPEG).

Meanwhile, point cloud compression is partially supported by, for example, an open-source library (Point Cloud Library) for point cloud-related processing.

SUMMARY

However, while the use of encoded data such as that of a point cloud in an actual device or service requires random access to a desired spatial position or object, there has been no functionality for random access in encoded three-dimensional data, nor an encoding method therefor.

The present disclosure thus aims to provide a three-dimensional data encoding method, a three-dimensional data decoding method, a three-dimensional data encoding device, or a three-dimensional data decoding device capable of providing random access functionality for encoded three-dimensional data.

Note that the present disclosure, which is configured to divide a space for encoding, enables quantization, prediction, etc. of such space, and thus is effective also for the case where no random access is performed.

The three-dimensional data encoding method according to one aspect of the present disclosure is a three-dimensional data encoding method for encoding three-dimensional data that includes: dividing the three-dimensional data into first processing units, each being a random access unit and being associated with three-dimensional coordinates; and encoding each of the first processing units to generate encoded data.

The three-dimensional data decoding method according to another aspect of the present disclosure is a three-dimensional data decoding method for decoding three-dimensional data that includes: decoding each encoded data of first processing units, each being a random access unit and being associated with three-dimensional coordinates, to generate three-dimensional data of the first processing units.

Note that these general or specific aspects may be implemented as a system, a method, an integrated circuit, a computer program, or a computer-readable recording medium such as a CD-ROM, or may be implemented as an any combination of a system, a method, an integrated circuit, a computer program, and a recording medium.

The present disclosure provides a three-dimensional data encoding method, a three-dimensional data decoding method, a three-dimensional data encoding device, or a three-dimensional data decoding device capable of providing random access functionality for encoded three-dimensional data.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a diagram showing an example of meta information according to the embodiment.

DETAILED DESCRIPTION OF THE EMBODIMENT

Figure 1:
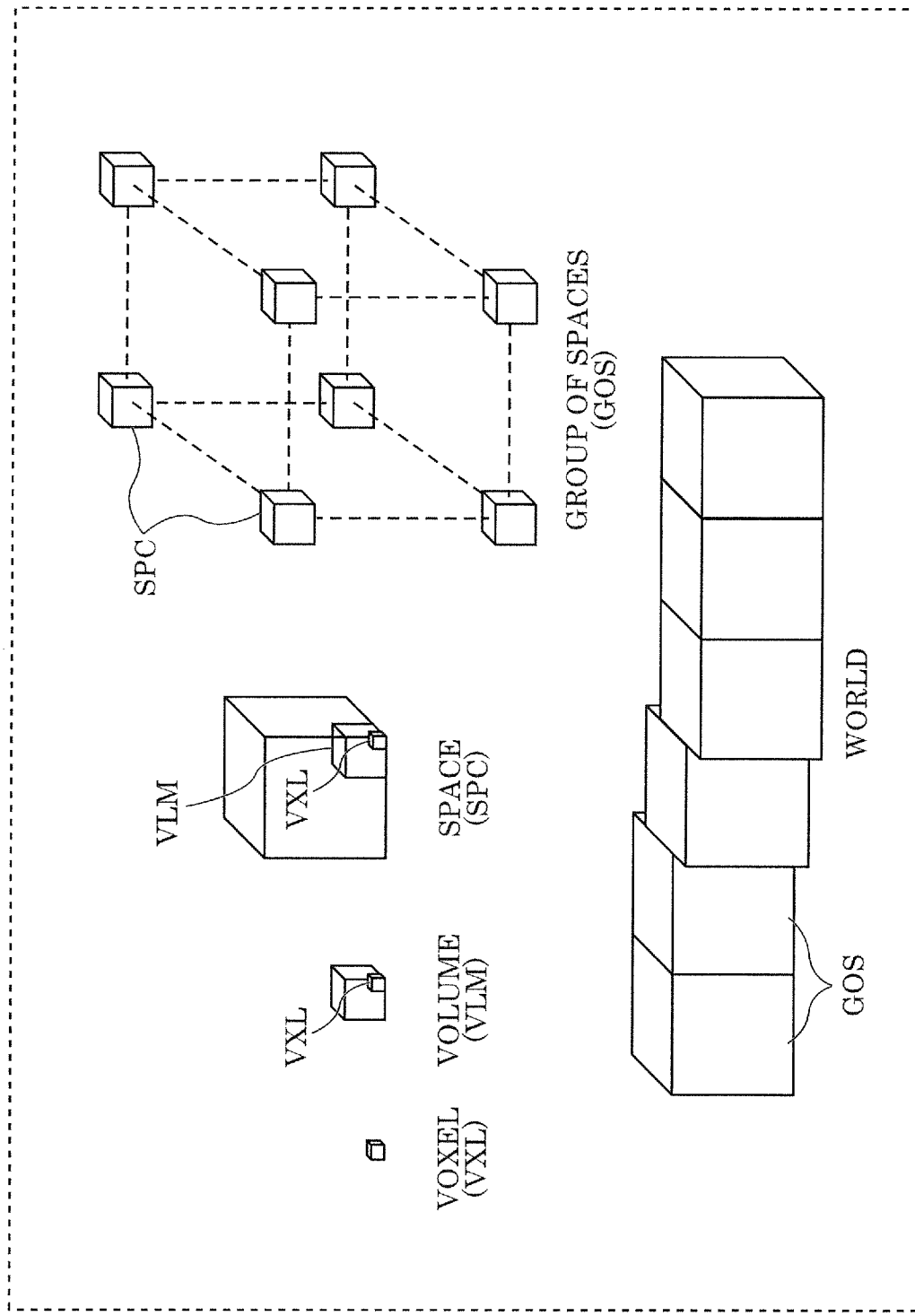
FIG. 1. is a diagram showing the structure of encoded three-dimensional data according to an embodiment.

The three-dimensional data encoding method according to one aspect of the present disclosure is a three-dimensional data encoding method for encoding three-dimensional data, the method including: dividing the three-dimensional data into first processing units, each being a random access unit and being associated with three-dimensional coordinates; and encoding each of the first processing units to generate encoded data.

This enables random access on a first processing unit basis. The three-dimensional data encoding method is thus capable of providing random access functionality for encoded three-dimensional data.

For example, the three-dimensional data encoding method may include generating first information indicating the first processing units and the three-dimensional coordinates associated with each of the first processing units, and the encoded data may include the first information.

For example, the first information may further indicate at least one of an object, a time, and a data storage location that are associated with each of the first processing units.

For example, in the dividing, each of the first processing units may be further divided into second processing units, and in the encoding, each of the second processing units may be encoded.

For example, in the encoding, a current second processing unit among the second processing units included in a current first processing unit among the first processing units may be encoded by referring to another of the second processing units included in the current first processing unit.

With this, the encoding efficiency is increased by referring to another second processing unit.

For example, in the encoding, one of three types may be selected as a type of the current second processing unit, and the current second processing unit may be encoded in accordance with the type that has been selected, the three types being a first type in which another of the second processing units is not referred to, a second type in which another of the second processing units is referred to, and a third type in which other two of the second processing units are referred to.

For example, in the encoding, a frequency of selecting the first type may be changed in accordance with the number, or sparseness and denseness of objects included in the three-dimensional data.

This enables an adequate setting of random accessibility and encoding efficiency, which are in a tradeoff relationship.

For example, in the encoding, a size of the first processing units may be determined in accordance with the number, or sparseness and denseness of objects or dynamic objects included in the three-dimensional data.

This enables an adequate setting of random accessibility and encoding efficiency, which are in a tradeoff relationship.

For example, each of the first processing units may be spatially divided in a predetermined direction to have layers, each including at least one of the second processing units, and in the encoding, each of the second processing units may be encoded by referring to another of the second processing units included in an identical layer of the each of the second processing units or included in a lower layer of the identical layer.

This achieves an increased random accessibility to an important layer in a system, while preventing a decrease in the encoding efficiency.

For example, in the dividing, among the second processing units, a second processing unit including only a static object and a second processing unit including only a dynamic object may be assigned to different ones of the first processing units.

This enables easy control of dynamic objects and static objects.

For example, in the encoding, dynamic objects may be individually encoded, and encoded data of each of the dynamic objects may be associated with a second processing unit, among the second processing units, that includes only a static object.

This enables easy control of dynamic objects and static objects.

For example, in the dividing, each of the second processing units may be further divided into third processing units, and in the encoding, each of the third processing units may be encoded.

For example, each of the third processing units may include at least one voxel, which is a minimum unit in which position information is associated.

For example, each of the second processing units may include a characteristic point group derived from information obtained by a sensor.

For example, the encoded data may include information indicating an encoding order of the first processing units.

For example, the encoded data may include information indicating a size of the first processing units.

For example, in the encoding, the first processing units may be encoded in parallel.

Also, the three-dimensional data decoding method according another aspect of the present disclosure is a three-dimensional data decoding method for decoding three-dimensional data, the method including: decoding each encoded data of first processing units, each being a random access unit and being associated with three-dimensional coordinates, to generate three-dimensional data of the first processing units.

This enables random access on a first processing unit basis. The three-dimensional data decoding method is thus capable of providing random access functionality for encoded three-dimensional data.

Also, the three-dimensional data encoding device according to still another aspect of the present disclosure is a three-dimensional data encoding device that encodes three-dimensional data that may include: a divider that divides the three-dimensional data into first processing units, each being a random access unit and being associated with three-dimensional coordinates; and an encoder that encodes each of the first processing units to generate encoded data.

This enables random access on a first processing unit basis. The three-dimensional data encoding device is thus capable of providing random access functionality for encoded three-dimensional data.

Also, the three-dimensional data decoding device according to still another aspect of the present disclosure is a three-dimensional data decoding device that decodes three-dimensional data that may include: a decoder that decodes each encoded data of first processing units, each being a random access unit and being associated with three-dimensional coordinates, to generate three-dimensional data of the first processing units.

This enables random access on a first processing unit basis. The three-dimensional data decoding device is thus capable of providing random access functionality for encoded three-dimensional data.

Note that these general or specific aspects may be implemented as a system, a method, an integrated circuit, a computer program, or a computer-readable recording medium such as a CD-ROM, or may be implemented as an any combination of a system, a method, an integrated circuit, a computer program, and a recording medium.

The following describes an embodiment with reference to the drawings. Note that the following embodiment shows an exemplary embodiment of the present disclosure. The numerical values, shapes, materials, structural components, the arrangement and connection of the structural components, steps, the processing order of the steps, etc. shown in the following embodiment are mere examples, and thus are not intended to limit the present disclosure. Of the structural components described in the following embodiment, structural components not recited in any one of the independent claims that indicate the broadest concepts will be described as optional structural components.

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or its lower levels (the lower levels of the n-th level) may be sequentially indicated. For example, when only the n-th level is decoded, and the n−1th level or its lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
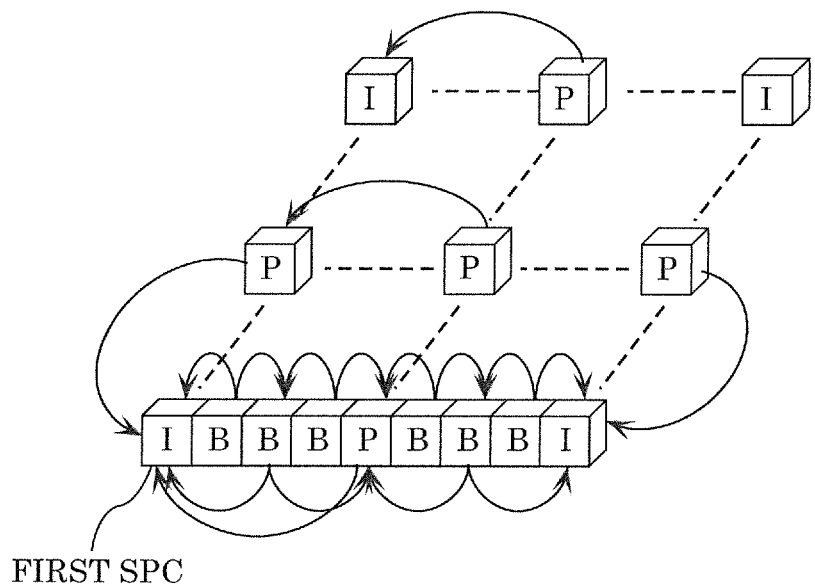
FIG. 2. is a diagram showing an example of prediction structures among SPCs that belong to the lowermost layer in a GOS according to the embodiment.
Figure 3:
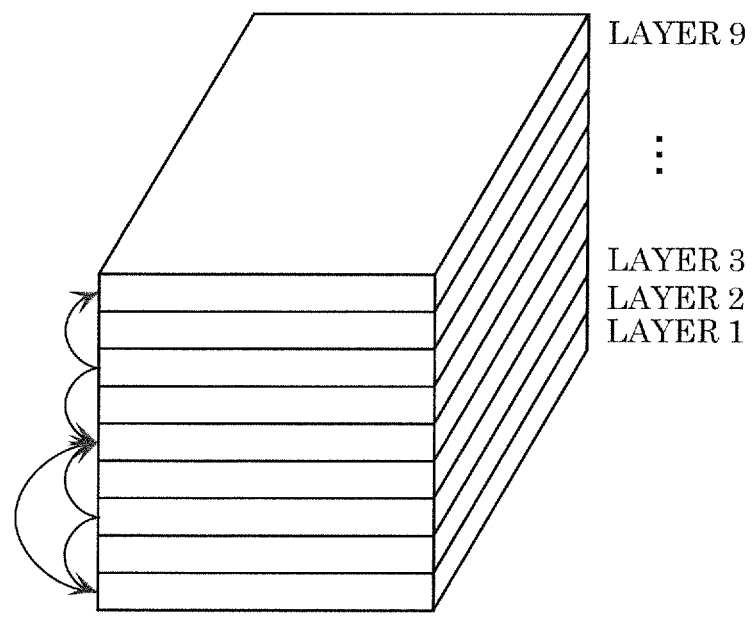
FIG. 3 is a diagram showing an example of prediction structures among layers according to the embodiment.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting characteristic points from point cloud data, or from video of a camera such as a stereo camera. In this description, an exemplary method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes only SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes only VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes only a static object and a VLM or a VXL that includes a dynamic object, on the basis of the identification information thus described.

The encoding device may also encode a dynamic object as at least one VLM or SPC, and may encode a VLM or a SPC including only a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
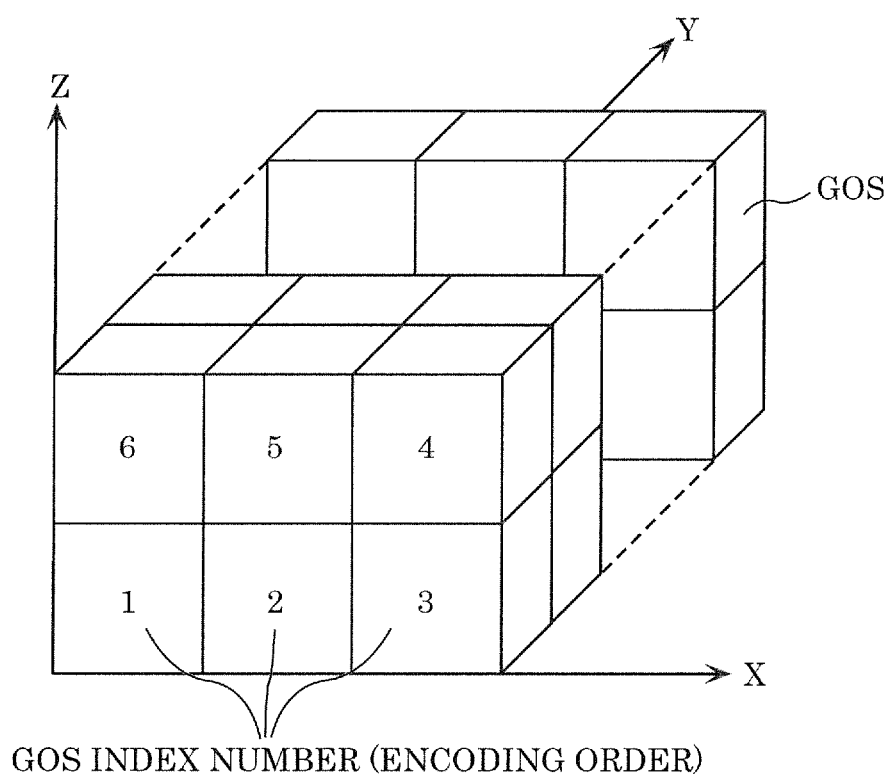
FIG. 4 is a diagram showing an example order of encoding GOSs according to the embodiment.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently, the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
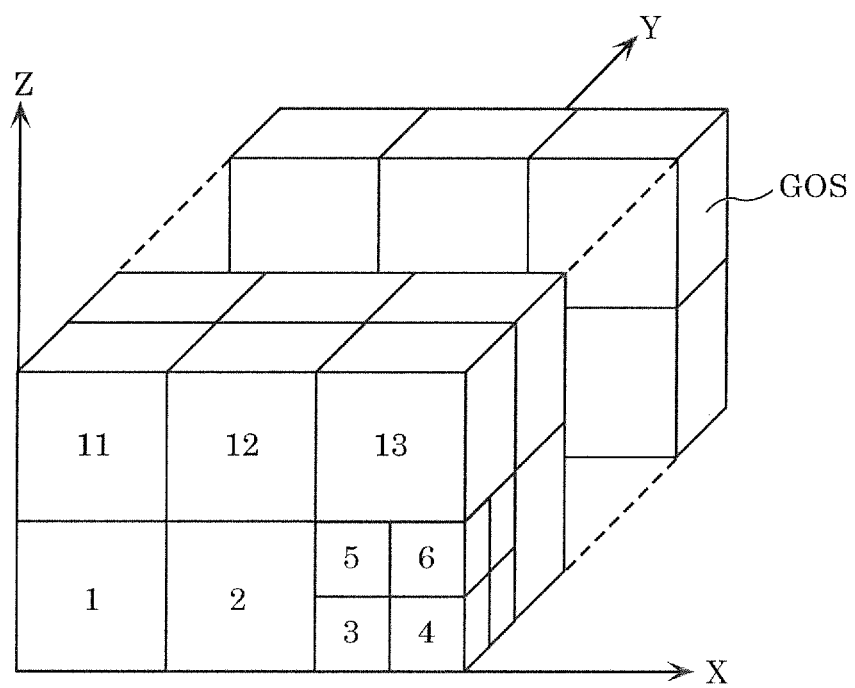
FIG. 5 is a diagram showing an example order of encoding GOSs according to the embodiment.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
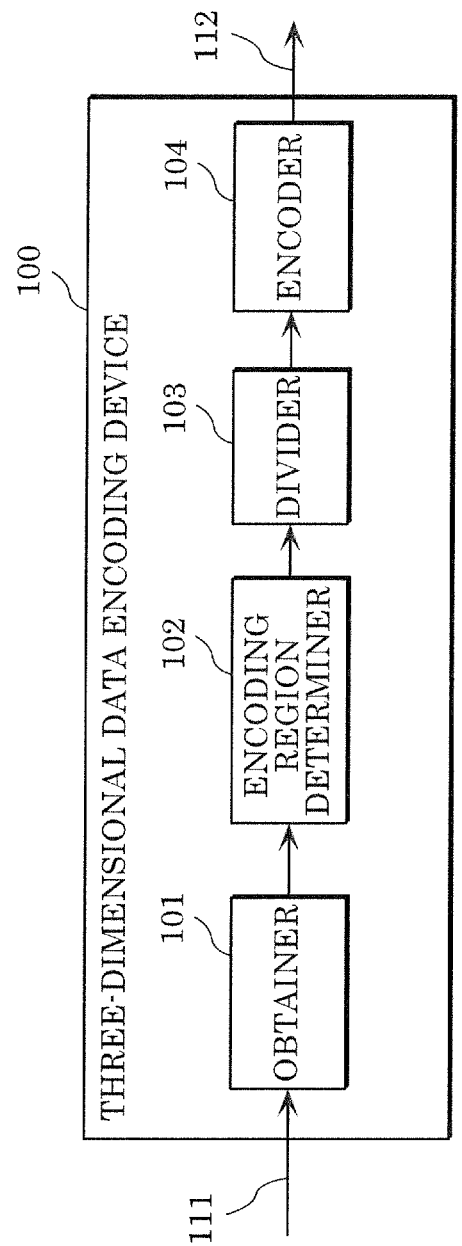
FIG. 6 is a block diagram of a three-dimensional data encoding device according to the embodiment.
Figure 7:
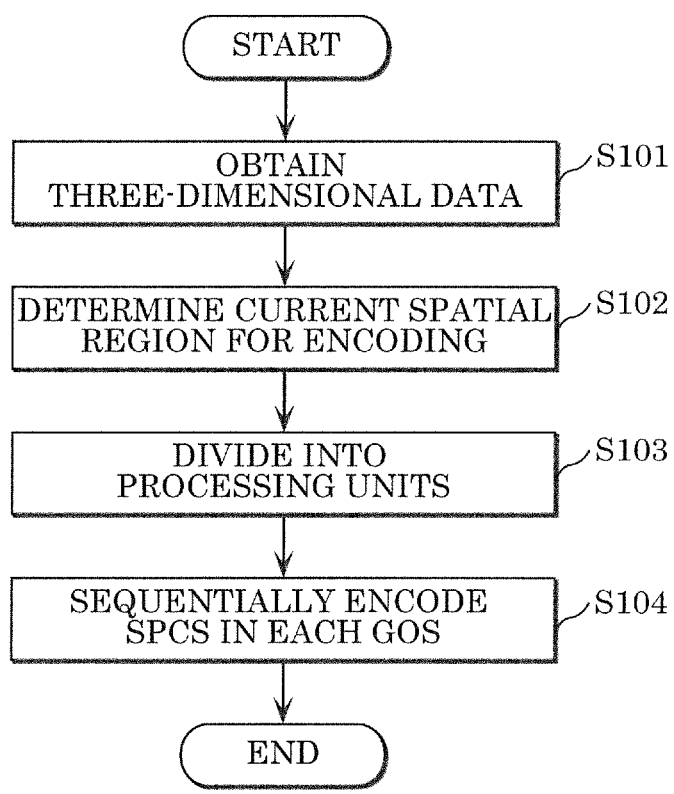
FIG. 7 is a flowchart of encoding processes according to the embodiment.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an exemplary operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point group data (S101).

Next, encoding region determiner 102 determines a current region for encoding from among spatial regions corresponding to the obtained point group data (S102). For example, in accordance with the position of a user or a vehicle, encoding region determiner 102 determines, as the current region, a spatial region around such position.

Next, divider 103 divides the point group data included in the current region into processing units. The processing units here means units such as GOSs and SPCs described above. The current region here corresponds to, for example, a world described above. More specifically, divider 103 divides the point group data into processing units on the basis of a predetermined GOS size, or the presence/absence/size of a dynamic object (S103). Divider 103 further determines the starting position of the SPC that comes first in the cording order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically, three-dimensional data encoding device 100 divides three-dimensional data into first processing units (GOSs), each being random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (GOS) by referring to another second processing unit (SPC) included in the current first processing unit (GOS). Stated differently, three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (GOS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
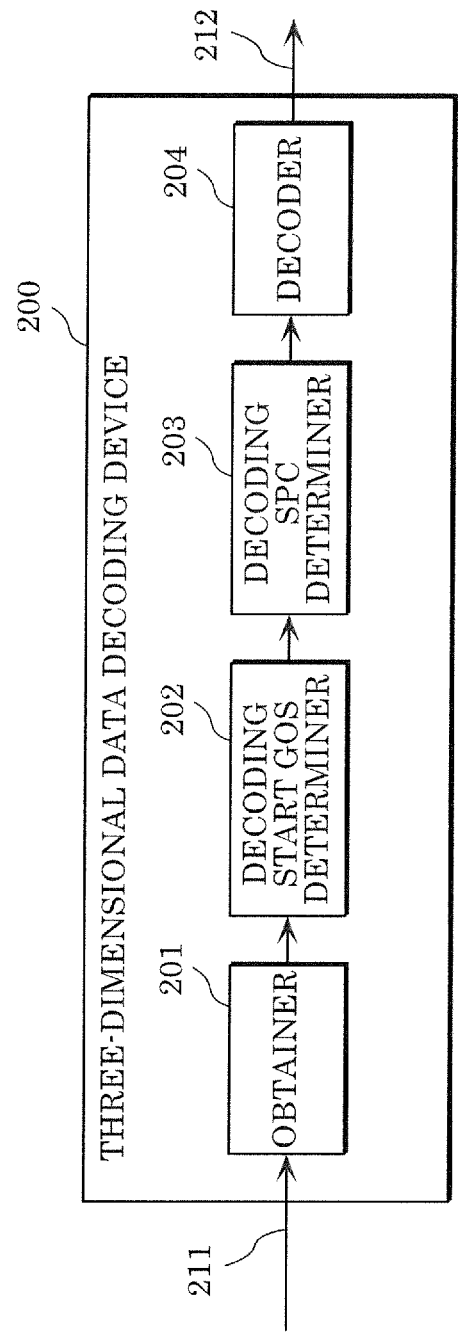
FIG. 8 is a block diagram of a three-dimensional data decoding device according to the embodiment.
Figure 9:
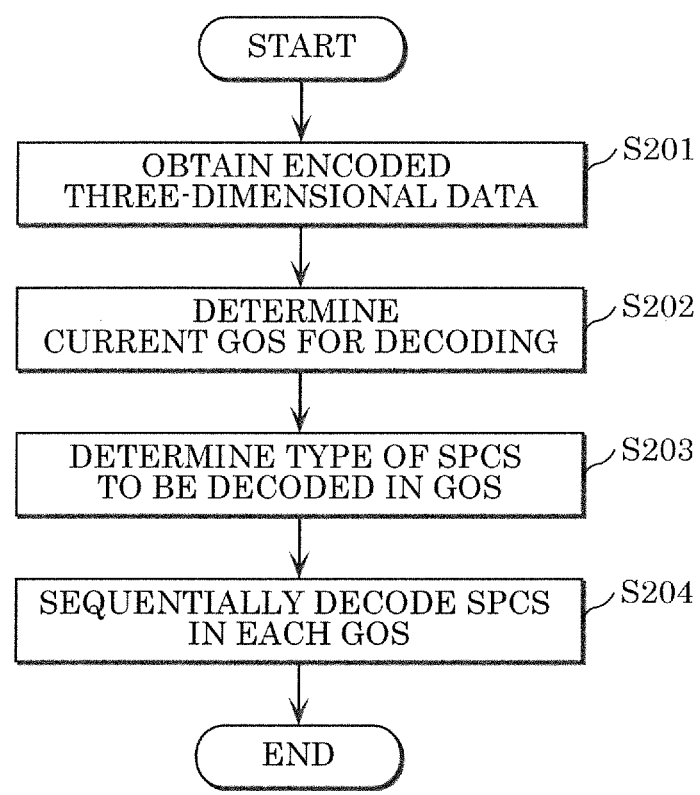
FIG. 9 is a flowchart of decoding processes according to the embodiment.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an exemplary operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type(s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (S204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. 10 is a diagram showing exemplary tables included in the meta-information. Note that not all the tables shown in FIG. 10 are required to be used, and thus at least one of the tables may be used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPC in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts characteristic points specific to an object from a three-dimensional point cloud, etc., when encoding a world, and detects the object on the basis of such characteristic points to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person," the tag value "1" indicates "car," and the tag value "2" indicates "signal." Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or VXL size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point group in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom level in the hierarchy.

The decoding device may also start decoding preferentially from the bottom level of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized).

The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting characteristic points from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects. For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of characteristic points and object recognition, and encodes the determined volume, voxel, or SPC, as a volume, a voxel, or a SPC to which random access is possible.

SPCs are classified into three types: I-SPC that is singly codable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including only a static object and a SPC including only a dynamic object are encoded or decoded as mutually different GOSs. Stated differently, a SPC including only a static object and a SPC including only a dynamic object are assigned to different GOSs.

Dynamic objects are encoded or decoded on an object-by-object basis, and are associated with at least one SPC including only a static object. Stated differently, a plurality of dynamic objects are individually encoded, and the obtained encoded data of the dynamic objects is associated with a SPC including only a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding devices uses, for example, a default value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a characteristic point group that is derived by use of information obtained by a sensor such as a depth sensor, a gyroscope sensor, or a camera sensor. The coordinates of the characteristic points are set at the central positions of the respective voxels. Furthermore, finer voxels enable highly accurate position information.

The characteristic point group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively, the encoding device and the decoding device predicts P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. Only a GOS that belongs to the same layer or a lower layer is referred to in a GOS that belongs to an upper layer. Stated differently, a GOS is spatially divided in a predetermined direction to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting characteristic points, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associates their identifiers with each other for encoding and decoding.

Although the three-dimensional data encoding device and the three-dimensional data decoding device according to the embodiment of the present disclosure have been described above, the present disclosure is not limited to such embodiment.

Note that each of the processing units included in the three-dimensional data encoding device or the three-dimensional data decoding device according to the embodiment is implemented typically as a large-scale integration (LSI), which is an integrated circuit (IC). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiment, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Also, the present disclosure may be embodied as a three-dimensional data encoding method or a three-dimensional data decoding method performed by the three-dimensional data encoding device or the three-dimensional data decoding device.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the three-dimensional data encoding device and the three-dimensional data decoding device according to one or more aspects have been described on the basis of the embodiment, the present disclosure is not limited to such embodiment. The one or more aspects may thus include an embodiment achieved by making various modifications to the above embodiment that can be conceived by those skilled in the art as well as an embodiment achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A point cloud encoding method for encoding a point cloud to generate an encoded stream, the point cloud encoding method comprising:
dividing the point cloud into first processing units, each of the first processing units being a random access unit and being associated with three-dimensional coordinates;
encoding the first processing units to generate encoded data items, each of the encoded data items corresponding to a respective one of the first processing units; and
generating first information indicating (i) the first processing units, (ii) the three-dimensional coordinates associated with each of the first processing units, and (iii) data storage locations, each of the data storage locations being associated with a respective one of the first processing units, and the data storage locations each being a location where an encoded data item corresponding to a first processing unit associated with the data storage location among the first processing units is to be stored,
wherein the encoded stream includes the first information and the encoded data items.

2. The point cloud encoding method according to claim 1, wherein the first information further indicates a time associated with each of the first processing units.

3. The point cloud encoding method according to claim 1, wherein in the dividing, each of the first processing units is further divided into second processing units, and
in the encoding, each of the second processing units is encoded.

4. The point cloud encoding method according to claim 3, wherein in the encoding, a current second processing unit among the second processing units included in a current first processing unit among the first processing units is encoded by referring to another of the second processing units included in the current first processing unit.

5. The point cloud encoding method according to claim 4, wherein in the encoding, one of three types is selected as a type of the current second processing unit, and the current second processing unit is encoded in accordance with the type that has been selected, the three types being a first type in which another of the second processing units is not referred to, a second type in which another of the second processing units is referred to, and a third type in which other two of the second processing units are referred to.

6. The point cloud encoding method according to claim 5, wherein in the encoding, a frequency of selecting the first type is changed in accordance with the number, or sparseness and denseness of objects included in the point cloud.

7. The point cloud encoding method according to claim 5, wherein in the encoding, a size of the first processing units is determined in accordance with the number, or sparseness and denseness of objects or dynamic objects included in the point cloud.

8. The point cloud encoding method according to claim 4, wherein each of the first processing units is spatially divided in a predetermined direction to have layers, each including at least one of the second processing units, and
in the encoding, each of the second processing units is encoded by referring to another of the second processing units included in an identical layer of the each of the second processing units or included in a lower layer of the identical layer.

9. The point cloud encoding method according to claim 3, wherein in the dividing, among the second processing units, a first one of the second processing units includes only a static object and a second one of the second processing units includes only a dynamic object,
wherein the first one of the second processing units and the second one of the second processing units are assigned to different ones of the first processing units.

10. The point cloud encoding method according to claim 3, wherein in the encoding, dynamic objects are individually encoded, and encoded data of each of the dynamic objects is associated with a second processing unit, among the second processing units, that includes only a static object.

11. The point cloud encoding method according to claim 3, wherein in the dividing, each of the second processing units is further divided into third processing units, and
in the encoding, each of the third processing units is encoded.

12. The point cloud encoding method according to claim 11,
wherein each of the third processing units includes at least one voxel, which is a minimum unit in which position information is associated.

13. The point cloud encoding method according to claim 3,
wherein each of the second processing units includes a characteristic point group derived from information obtained by a sensor.

14. The point cloud encoding method according to claim 1,
wherein the encoded data includes information indicating an encoding order of the first processing units.

15. The point cloud encoding method according to claim 1,
wherein the encoded data includes information indicating a size of the first processing units.

16. The point cloud encoding method according to claim 1,
wherein in the encoding, the first processing units are encoded in parallel.

17. The point cloud encoding method according to claim 1, wherein
each of the first processing units includes second processing units,
each of the encoded data items includes encoded data items each corresponding to a respective one of the second processing units included in a corresponding first processing unit among the first processing units, and
each of the data storage locations is an address of an encoded data item of a starting second processing unit, the starting second processing unit being located at a starting position of the second processing units included in a first processing unit associated with the data storage location among the first processing units.

18. A point cloud decoding method for decoding a point cloud from an encoded stream, the point cloud decoding method comprising:
decoding encoded data items included in the encoded stream to generate the point cloud of first processing units, each of the first processing units being a random access unit and being associated with three-dimensional coordinates, and each of the encoded data items corresponding to a respective one of the first processing units; and
obtaining first information from encoded three-dimensional data from the encoded stream, the first information indicating (i) the first processing units, (ii) the three-dimensional coordinates associated with each of the first processing units, and (iii) data storage locations, each of the data storage locations being associated with a respective one of the first processing units, and the data storage locations each being a location where an encoded data item corresponding to a first processing unit associated with the data storage location among the first processing units is to be stored,
wherein the encoded data items are decoded using the first information.

19. The point cloud decoding method according to claim 18, wherein
each of the first processing units includes second processing units,
each of the encoded data items includes encoded data items each corresponding to a respective one of the second processing units included in a corresponding first processing unit among the first processing units, and
each of the data storage locations is an address of an encoded data item of a starting second processing unit, the starting second processing unit being located at a starting position of the second processing units included in a first processing unit associated with the data storage location among the first processing units.

20. A point cloud encoding device that encodes a point cloud to generate an encoded stream, the point cloud encoding device comprising:
a divider that divides the point cloud into first processing units, each of the first processing units being a random access unit and being associated with three-dimensional coordinates; and
an encoder that encodes the first processing units to generate encoded data items, each of the encoded data items corresponding to a respective one of the first processing units,
wherein the divider generates first information indicating (i) the first processing units, (ii) the three-dimensional coordinates associated with each of the first processing units, and (iii) data storage locations, each of the data storage locations being associated with a respective one of the first processing units, and the data storage locations each being a location where an encoded data item corresponding to a first processing unit associated with the data storage location among the first processing units is to be stored, and
wherein the encoded stream includes the first information and the encoded data items.

21. A point cloud decoding device that decodes a point cloud from an encoded stream, the point cloud decoding device comprising:
a decoder that decodes encoded data items included in the encoded stream to generate the point cloud of first processing units, each of the first processing units being a random access unit and being associated with three-dimensional coordinates, and each of the encoded data items corresponding to a respective one of the first processing units; and
an obtainer that obtains first information from encoded three-dimensional data from the encoded stream, the first information indicating (i) the first processing units, (ii) the three-dimensional coordinates associated with each of the first processing units, and (iii) data storage locations, each of the data storage locations being associated with a respective one of the first processing units, and the data storage locations each being a location where an encoded data item corresponding to a first processing unit associated with the data storage location among the first processing units is to be stored,
wherein the encoded data items are decoded using the first information.

* * * * *